H. W. PLEISTER.
BOLT ANCHOR.
APPLICATION FILED JULY 17, 1917.
1,291,119.
Patented Jan. 14, 1919.
2 SHEETS—SHEET 1.
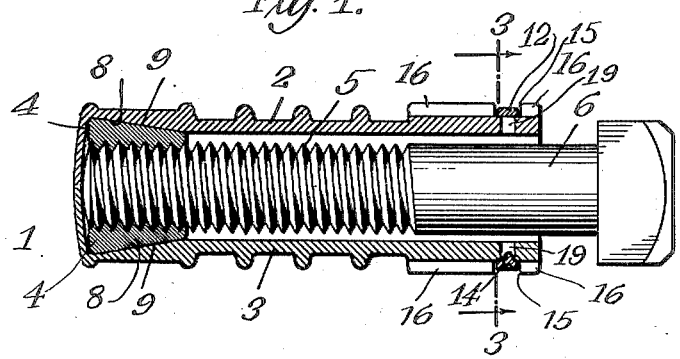
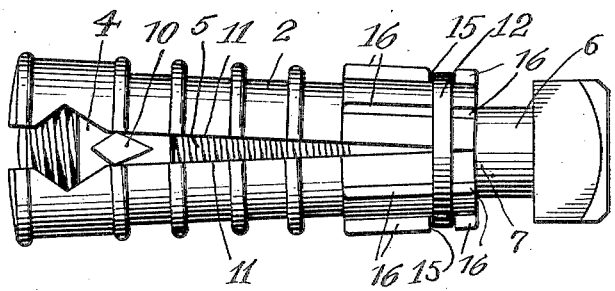
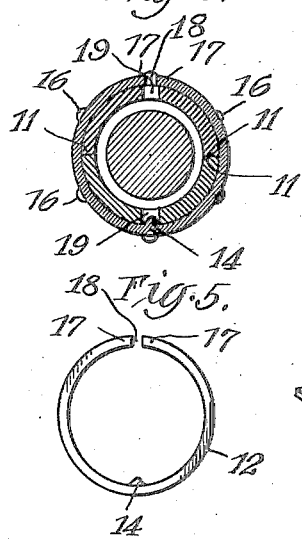
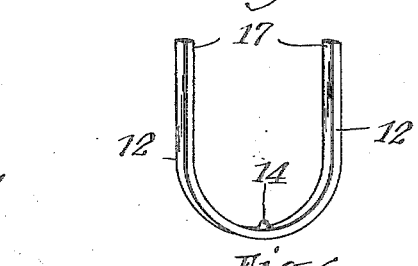
Inventor
Henry W. Pleister
By his Attorney
Alan M. Johnson

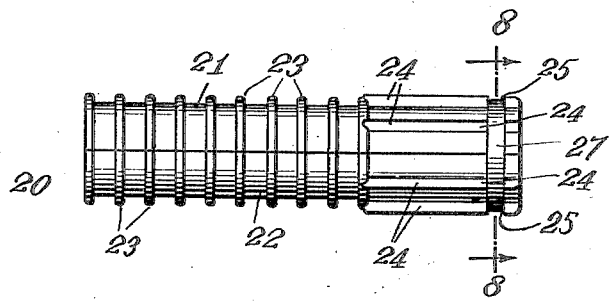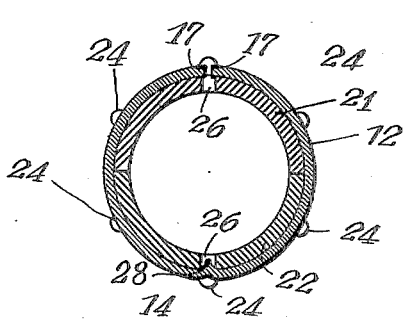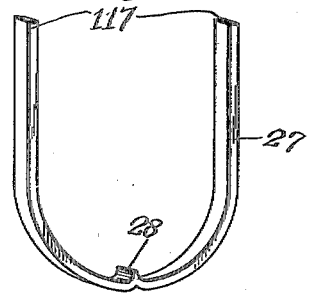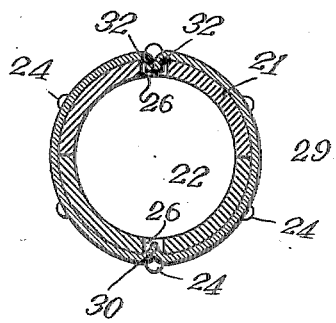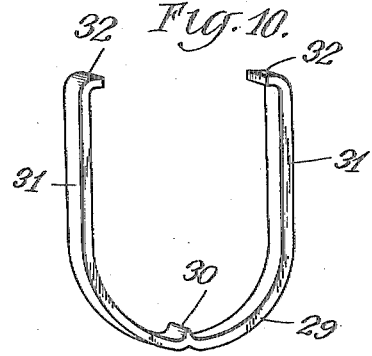

UNITED STATES PATENT OFFICE.

HENRY W. PLEISTER, OF WESTFIELD, NEW JERSEY, ASSIGNOR TO HENRY B. NEWHALL; HENRY B. NEWHALL, JR., EXECUTOR OF SAID HENRY B. NEWHALL, DECEASED.

BOLT-ANCHOR.

1,291,119.           Specification of Letters Patent.       Patented Jan. 14, 1919.

Application filed July 17, 1917. Serial No. 180,999.

*To all whom it may concern:*

Be it known that I, HENRY W. PLEISTER, a citizen of the United States, residing at Westfield, in the county of Union and State of New Jersey, have invented certain new and useful Improvements in Bolt-Anchors, of which the following is a specification, taken in connection with the accompanying drawings.

My invention relates to bolt anchors.

More particularly my invention relates to a bolt anchor having two or more parts and to means for holding the parts together. My invention may be applied either to the type of bolt anchors known as machine type, or the lag screw type, or any other form of bolt anchor formed of a plurality of expansible members, which should be secured together to permit more ready handling, shipping, sale and use.

In the drawings the same reference numerals refer to similar parts in the different figures:—

Figure 1 is a longitudinal vertical section through a bolt anchor of the machine type showing my invention applied to that type of anchor.

Fig. 2 is a side elevation of the bolt anchor shown in Fig. 1 with the expansible members partly expanded.

Fig. 3 is a vertical cross section upon the line 3, 3 of Fig. 1 looking in the direction of the arrows.

Fig. 4 is a perspective view of the preferred form of my assembling band.

Fig. 5 is a side elevation of my assembling band detached from the bolt anchor showing how it is bent to form a non-spring split ring.

Fig. 6 is a perspective view of the blank from which my assembling band is formed.

Fig. 7 is a side elevation of a bolt anchor known as a lag shield, showing my invention applied to that type of bolt anchor.

Fig. 8 is a transverse vertical section substantially on the line 8, 8 of Fig. 7 looking in the direction of the arrows.

Fig. 9 is a perspective view of a modified form of assembling band showing a different manner of forming a projection.

Fig. 10 is a perspective view of another modified form of assembling band.

Fig. 11 is a transverse vertical section through a bolt anchor formed of two expansible members, showing the modified form of assembling band of Fig. 10 holding the members together.

In the illustrative embodiments of my invention shown in the drawings 1, Fig. 1, is a bolt anchor of the machine type, formed of the expansible members 2 and 3 having the nut or wedge 4 which coöperates with the machine screw threads 5 of the machine bolt 6 to spread the expansible members 2 and 3 causing them to rock upon each other at the pivoting point 7, Fig. 2. As is well known in this type of bolt anchors the inclined surface 8 of the nut or wedge 4 is caused to move along the inclined surface 9 of the expansible members 2 and 3 by rotating the machine bolt 6. This wedge action is supplemented by the supplemental wedges 10 (only one being shown in the drawings) carried by the nut or wedge 4 moving between the parting surfaces 11, 11 of the expansible members 2 and 3.

It is desirable to hold the expansible members 2 and 3 together so as to prevent the accidental displacement of the nut or wedge 4, and also for the purpose of shipping, sale, and convenience in use.

By my invention I employ an assembling band 12 preferably formed of soft steel, or of some other metal, which has no spring or resiliency.

My preferred form of assembling band is made from the blank 13, Fig. 6 which is bent up into the U-shape assembling band shown in Fig. 4. Preferably about the middle of the blank 13 I strike up in any suitable manner, a portion of the metal to form a teat 14, though in some instances this teat or projection may be omitted.

On the bolt anchor, preferably as near the pivoting point 7 as possible, I form a groove 15. This groove may be formed in various ways. In the particular form of bolt anchor illustrated the longitudinally extended ribs 16, 16 are cut away to form this groove. In locating the assembling band the parts of the bolt anchor are brought together as shown in Fig. 1, usually with the omission of the machine bolt 6, and the U-shape assembling band is then located in the groove 15 its free arms 17, 17 being then bent toward each other, by any suitable tool, so as to form the split non-resilient assembling band shown in Figs. 1, 2, 3 and, in detail, in Fig. 5.

It is very desirable that the opening 18 between the ends 17, 17 of the assembling band 12 should not register with the parting surfaces 11, 11 of the expansible members 2 and 3. Should this occur there would be danger of the members 2 and 3 moving upon each other and becoming disassembled.

To guard against this and to insure that the assembling band will always be properly positioned on the bolt anchor I cast, or otherwise form, one or more holes or openings 19, 19 in the expansible members 2 and 3; these holes 19, 19 are preferably located 90 degrees from the dividing surfaces 11, 11. For convenience in manufacture an opening 19 is made or cast in each of the sections 2 and 3, even though the particular form of assembling band may only have a projection to coöperate with one of said openings 19. In the preferred construction of the assembling band the projection, in the form of the teat 14, is made to seat in one of the openings 19 which will insure that the ends 17, 17 will fall 90 degrees from the parting surfaces 11, 11.

By using such a non-resilient assembling band it can be readily bent to its seat in the groove 15 with the minimum amount of time and labor. By placing it near the pivoting point 7 it will have substantially no tendency to open until the expansible members 2 and 3 have substantially reached their maximum expansion in the hole in which they are mounted.

My invention is likewise adapted to other forms of bolt anchors such, for example, as the lag shield type 20 Fig. 7. In this form as is well known, the lag screw (not shown) contacts directly with the interior of the expansible members 21 and 22 and expands them without the aid of a wedge.

On this lag shield are provided transverse ribs 23, 23 and longitudinally extending ribs 24, 24, these latter ribs being cut away to form a groove 25 for the assembling band 12. The two halves 21, and 22 of the lag shield each have holes or apertures 26, 26 which are cast or otherwise formed in them for the reception of the projection, or projections which may be formed upon the assembling band. In Fig. 8 I have shown one of the openings 26 coöperating with the projection in the form of a teat 28. The action and the advantages of my assembling band in this type of bolt anchor are the same as that previously described.

Of course, it is understood that different forms of assembling bands may be used. I have shown for example in Fig. 9 an assembling band 27 having a projection 28 formed by crimping the metal of the band.

In some cases I may use an assembling band 29, Fig. 10 having a projection 30 to coöperate with one of the openings in the expansible members, the arms 31, 31 of the U-shaped assembling band 29, being provided with inturned lugs 32, 32 which are adapted to be pressed into the other openings or aperture in the expansible members so as to form a double lock preventing accidental displacement of the U-shaped assembling band, Fig. 11. Of course it is to be understood that anyone of the U-shaped assembling bands which I have illustrated, by way of example, may be used inter-changeably with the different forms of bolt anchors that I have illustrated or any other form of bolt anchor.

Having thus described this invention in connection with different illustrative embodiments thereof, to the details of which I do not desire to be limited, what is claimed as new and what is desired to be secured by Letters Patent is set forth in the appended claim:

In a bolt anchor the combination of a plurality of identical expansible parts to avoid rights and lefts, each of said parts being provided with a recess, and an assembling band having a projection between its ends fitting into one of said recesses to prevent rotation of the band.

HENRY W. PLEISTER.

Witnesses:
 ELIZABETH J. ROTH,
 MARY R. RYAN.